Oct. 30, 1951    M. BONNET    2,573,242
STATIC APPARATUS FOR RELIEF PHOTOGRAPHY
Filed May 8, 1947    2 SHEETS—SHEET 1

INVENTOR.
Maurice Bonnet
BY
Haseltine, Lake & Co.
AGENTS.

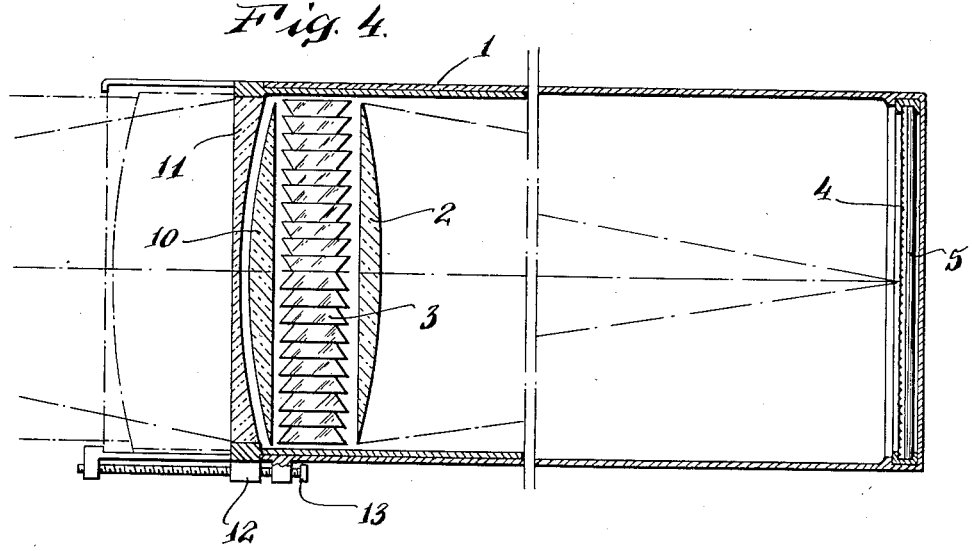
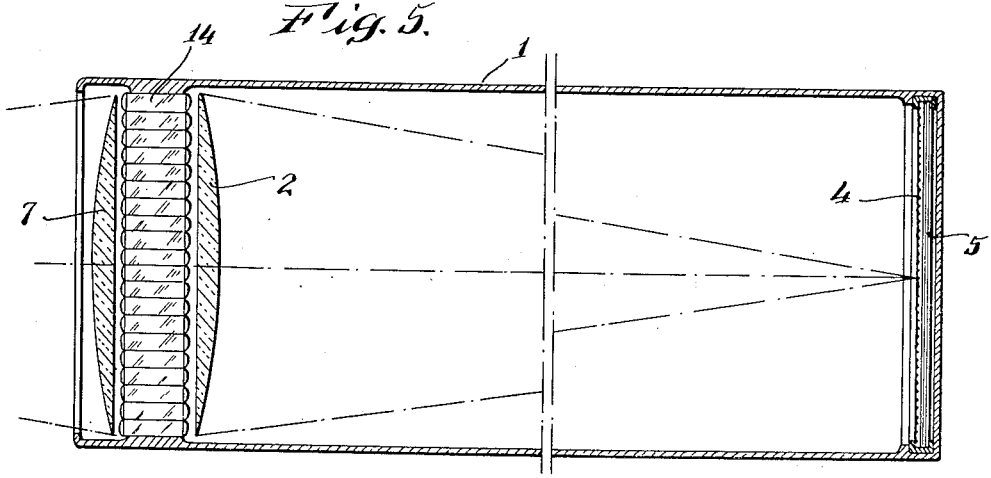

Patented Oct. 30, 1951

2,573,242

UNITED STATES PATENT OFFICE 2,573,242

STATIC APPARATUS FOR RELIEF PHOTOGRAPHY

Maurice Bonnet, Paris, France, assignor to La Reliephographie, Société pour l'Exploitation des Procédés de Photographie en Relief, Maurice Bonnet, Paris, France, a corporation of France Application May 8, 1947, Serial No. 746,748
In France May 15, 1946

10 Claims. (Cl. 95—18)

1

The purpose of the present invention is an apparatus for relief photography enabling snap-shotting and remarkable for the feature that it has no member in movement during the exposure, with the exception, naturally, of its shutter.

It is known that a photographic objective is only capable of giving of the subject a reversed image or an inverted relief or pseudo-scopic picture. A stereoscopic negative of the screen type for example taken with an ordinary objective thus requires a reversal operation of the image so that the positive proof taken from this negative may appear with its normal relief.

In the French Patent 618,880 of November 20, 1925, it has already been proposed for stereoscopic photography, to use means for fractional reversal of the image, in the form of prisms arranged in a transverse row in front of a series of lenses, one prism corresponding to each lens. According to this patent, the prisms and the lenses form an arc of a circle with well defined radius.

Theoretically, an arrangement thus formed actually allows the correct registering of stereoscopic photographs. In practice, however, the difficulties of assembling in a curved line and of the exact regulating of the prisms and the lenses considerably complicate the making of such an apparatus.

The above disadvantages are completely obviated in the apparatus constructed in accordance with the invention where the multiple objective-lenses are replaced by a single lens of large diameter, creating the stereoscopic base of observation. On the other hand, the reversing optical members which ensure the fractional turning of the image are arranged in a rectilinear row which makes their assembly much more easy.

In the attached drawings, a number of alternative forms of construction of the invention have been shown.

2

Figure 4 is a plan view of an apparatus which makes it possible to operate at progressively variable distances.

Finally, Figure 5 is a plan view of an alternative form of construction in which the reversing members are formed by afocal optical systems.

Figure 1:
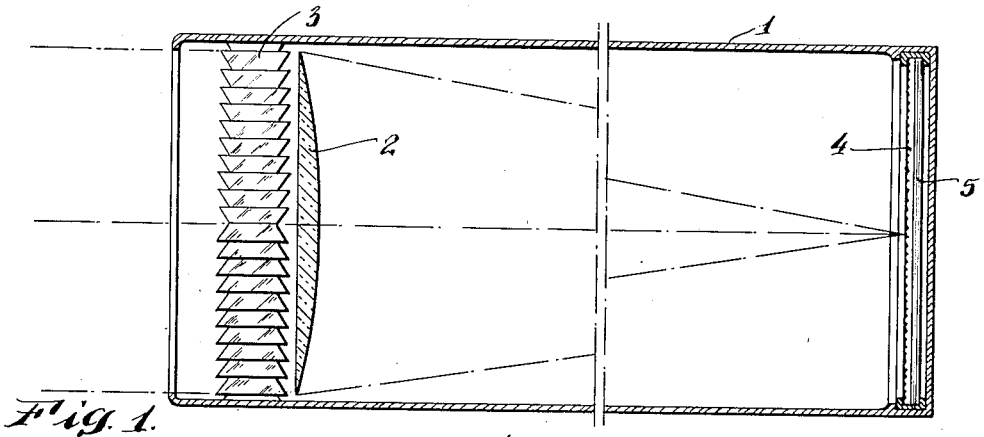
Figure 1 shows diagrammatically in plan view without regard to proportions, a first apparatus according to the invention, of very simplified construction and capable of photographing stereoscopically and in snapshot objects situated practically at infinity.

The apparatus according to Figure 1 is simply constituted by a dark chamber fitted with an objective of large diameter, formed by the plano-convex lens 2 creating the stereoscopic base of observation, in front of which is arranged a series of inverting prisms 3 (Wollaston prisms) in a rectilinear horizontal row.

At its rear part, the chamber 1 is capable of receiving a frame containing in known manner an optical selector 4 with cylindrical lenticular elements and the negative plate 5 upon which the image is to be produced.

Figure 3:
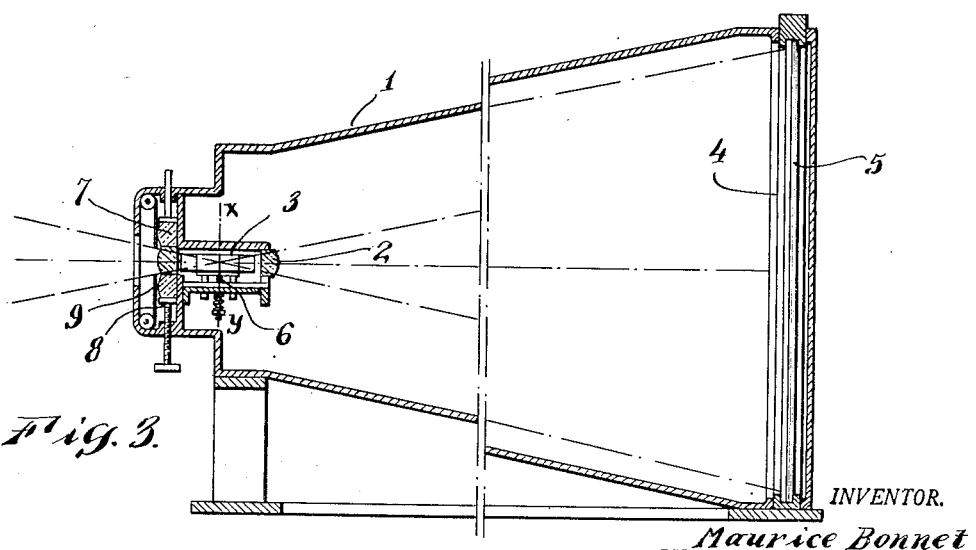
Figure 3 is an elevation of an improved constructional form making possible the exposure at several successive distances.

According to the invention, the prisms 3 are each fixed to their individual mounting, such as that shown in its entirety by 6 in Figure 3 which allows them to be regulated in the three planes and in particular about their vertical axis X—Y.

This possibility of independently regulating each prism makes it possible to compensate at least to a certain extent, the aberrations which the lens 2 may possess (sphericity and chromatism).

Indeed, the mounting 6 always makes it possible to direct each prism so that the luminous rays which it refracts converge very exactly in the image-plane with those refracted by the other prisms, thus eliminating the caustic curve of the lens 2 the optical qualities of which may be mediocre without the purity of the images being practically affected thereby.

This regulation will be very easily effected in the construction of the apparatus by successively observing through each prism the image of several luminous points on a ground glass which occupies the place of optical selector 4.

In accordance with the invention, the extension of the chamber 1 is exactly equal to the focal length of the objective-lens 2. This focal length is selected so that the angle of opening of this lens is equal to that of the lenticular elements of the selector screen 4 placed against the sensitive surface 5.

The apparatus is completed by any type of shutter such as the curtain shutter shown diagrammatically at 9 in Figure 3 and arranged in front of or behind the optical part of the apparatus or in front of the selector 4.

It is obvious that the lens 2 can be cut so as to form a simple horizontal band the height of which will be just sufficient not to obscure the field of the prisms 3.

The working of the arrangement which has just been described is very simple and does not require any special explanation. The parallel rays emanating from the subject situated at infinity are inverted by the prisms 3, each of which ensures the turning of the part of the image to which it corresponds.

As a result of this inversion, the image formed in the plane of negative plate 5 will be an orthoscopic image, that is to say, one which has the correct relief and not a pseudoscopic image as would be obtained normally with an ordinary objective, unprovided with inverters.

It will be seen that the orthoscopic image formed in the plane of the light-sensitive surface 5 is divided by the cylindrical elements of lenticular selecting network 4 into vertical strips. These strips are each gathered together or compressed by the vertical cylindrical elements into a line of light placed behind each elementary lens forming an exposed line on the light-sensitive surface of negative plate 5.

Since, however, objective 2 is of large diameter, the objective may be considered as viewing the subject simultaneously from a plurality of viewing points which are spaced horizontally and which therefore projects simultaneously onto the lenticular selecting network 4 a plurality of slightly different images each of which corresponds to a different view of the same subject. To each of these different images emanating from the different points of objective 2, there are corresponding different image lines forming a series of lines on light-sensitive surface 5. The exposed and developed negative when viewed directly will give only a mixture of unrelated lined images. If, however, a print is made from this developed negative, although this print will also be incomprehensible when viewed directly, the mere use of a lenticular selecting network 4 of a camera will give to the observer a correct reproduction of the subject photographed. The observer's right eye will see only the image lines corresponding to one of the images emanating from the objective and his left eye will see the image lines corresponding to another of these emanating images. These two image lines viewed simultaneously by the observer will give a stereoscopic impression in exactly the same manner as a stereoscopic couple.

The negative 5, once it has been developed, is printed according to the process which is the subject of the application for French patent of August 10, 1943 (case XXV) to obtain positive lined proofs which, examined through a selector with the same characteristics as the selector 4, give an image in correct relief of the subject. This printing process ensures, in effect, the right-left turning of the image necessary so that the latter should appear normally to the observer. If the printing method which has just been indicated is not used, it is necessary to produce the right-left turning of the image in the photographic apparatus itself. This result can be easily obtained by combining the prisms 3 with a second inverting member of any type or by replacing the simple Wollaston prisms 3 shown by Wollaston prisms of roof type.

The apparatus which has just been described operates in the case of subjects situated at infinity. The second form of construction of the invention which is the subject of Figure 2, refers to an apparatus making possible the taking of photographs at finite distance of any amount, for example 3 meters.

For this purpose, a front lens 7 is placed in front of the prisms 3. The focal length of this lens is equal to the distance of photograph chosen so that the prisms 3 are always struck by a bundle of parallel rays. Otherwise, the arrangement is completely identical with that shown in Figure 1.

In order to construct an apparatus capable of operating at different distances, it is sufficient in agreement with the invention, to fit it with interchangeable lenses 7 and of focal lengths in stages and to provide a movable form of fixing for each of these lenses, in front of the prisms 3.

The apparatus which is the subject of Figure 3 comprises several front lenses 7 assembled, three in the example selected. According to the invention, these lenses with focal lengths in stages are fixed in a mounting 8 of any type which makes it possible to bring them successively to the level of the prisms 3 so as to be able to operate at different distances. The curtain shutter is shown diagrammatically at 9.

Figure 4 shows an improved form of construction which makes possible a progressive regulation of the distance of the photographing. For this purpose and in agreement with the invention, the front lens is formed by two elements 10 and 11, of the same power, but the one positive and the other negative and preferably, plano-convex and plano-concave as shown. The front element 4 is fixed in a sliding mounting, shown diagrammatically at 12, which makes it possible to vary within certain limits the distance separating these two elements. It is obvious that when they are in contact with each other their effects are reciprocally cancelled and that they then act like a plate with parallel faces without influencing the path of the light rays. The apparatus is then intended for infinite distance. On the other hand, on moving the element 11 away from the element 10 the focal length of the group 11—12 is shortened, thus making it possible for the apparatus to operate at distances which vary progressively when the regulating member 13 of the mounting 12 is manipulated.

In all the preceding constructional forms, the inversion members are constituted by simple Wollaston prisms. The invention is not of course limited to this particular type of inverter; it is possible to use for the same purpose roof-type Wollaston prisms as already mentioned, mirrors or afocal optical systems such as those shown at 14 in Figure 5, these latter ensuring the fractional turning of the image according to two perpendicular axes.

Figure 2:
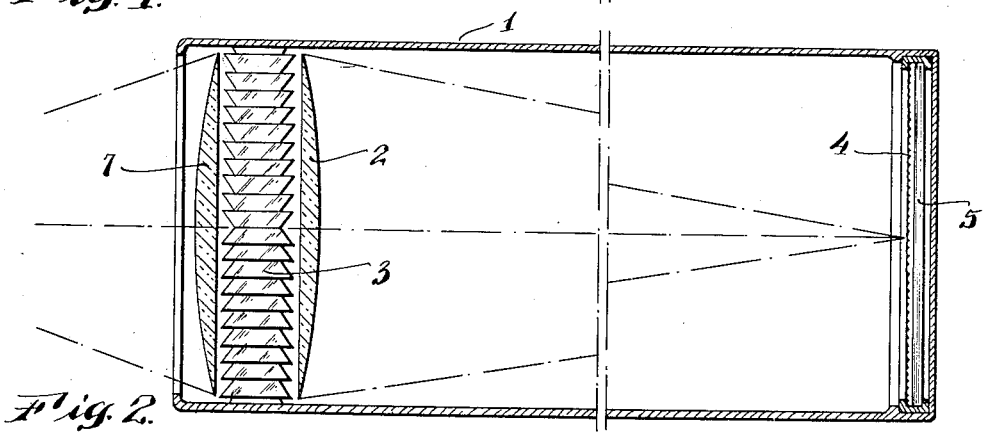
Figure 2 shows also in plan a second alternative form where the apparatus is intended for any finite distance.

The arrangement shown in Figure 2 makes possible the realisation of a particular type of apparatus with quite special properties. This case is that where the front and rear lenses are selected with the same focal length and are placed symmetrically with relation to the rectilinear row of inversion elements. In this case, all the aberrations which these lenses are capable of possessing are in opposite directions in each lens and reciprocally cancel each other. They thus constitute in combination with the inversion elements, an optical system which is rigorously stigmatic and achromatic for all the points of space.

In all the figures of the drawings, the prisms shown are of relatively large dimensions with relation to the lenses with which they are combined. In practice, their size will, in agreement with the invention, be reduced in a measure compatible with the requirements of construction, the purity of the images being all the greater, the smaller the elements on which the turning takes place.

It must be observed finally that the chamber 1 can be entirely rigid in construction which greatly facilitates its manufacture; indeed, no focussing of the image-plane is necessary as the image is always formed in the focal plane of the rear lens 2.

I claim:

1. In a snapshot apparatus for peri-stereoscopic photography having a photosensitive element, the combination of a rectilinear horizontal row of inversion prisms with an optical selector screen having vertical cylindrical lenticular elements covering the photosensitive element, and with a single convergent lens extending across and placed behind said row of inversion prisms, the aperture angle of said lens being selected equal to that of the cylindrical lenticular elements of the selector screen on which the image is formed.

2. In a snapshot apparatus for peri-stereoscopic photography at any limit distance and having a photosensitive element, the combination of a rectilinear horizontal row of inversion prisms with an optical selector screen having vertical cylindrical lenticular elements covering the photosensitive element, and with a convergent lens extending across and placed behind said row of inversion prisms, said row of inversion prisms being preceded by a front lens extending across said row to serve as the stereoscopic base of observation, and the focal length of which is equal to the distance from the subject photographed, so that the inversion prisms always work in a bundle of parallel rays.

3. In a snapshot apparatus for peri-stereoscopic photography at any limit distance and having a photosensitive element, the combination of a rectilinear horizontal row of inversion prisms with an optical selector screen having vertical cylindrical lenticular elements covering the photosensitive element, and with a convergent lens extending across and placed behind said row of inversion prisms, said row of inversion prisms being preceded by a front lens extending across said row to serve as the stereoscopic base of observation, and the focal length of which is equal to the distance from the subject photographed, the front lens and the rear lens being symmetrical and having the same focal length, all the aberrations of these two lenses being thus in opposite direction and cancelling each other reciprocally to constitute, in combination with said inversion prisms, an optical system which is rigorously stigmatic and achromatic for all the points of space.

4. In a snapshot apparatus for peri-stereoscopic photography at any limit distance and having a photosensitive element, the combination of a rectilinear horizontal row of inversion prisms with an optical selector screen having vertical cylindrical lenticular elements covering the photosensitive element, and with a convergent lens extending across and placed behind said row of inversion prisms, said row of inversion prisms being preceded by an interchangeable front lens extending across said row to serve as the stereoscopic base of observation, and the focal length of which is equal to the distance from the subject photographed.

5. In a snapshot apparatus for peri-stereoscopic photography at any limit distance and having a photosensitive element the combination of a rectilinear horizontal row of inversion prisms with an optical selector screen having vertical cylindrical lenticular elements covering the photo-sensitive element, and with a convergent lens extending across and placed behind said row of inversion prisms, said horizontal row of inversion prisms being preceded by a front lens extending across said row to serve as the stereoscopic base of observation, and the focal length of which is equal to the distance from the subject photographed, both lenses being limited to an horizontal rectangular band.

6. In a snapshot apparatus for peri-stereoscopic photography at any limit distance and having a photosensitive element the combination of a rectilinear horizontal row of inversion prisms with an optical selector screen having vertical cylindrical lenticular elements covering the photo-sensitive element, and with a convergent lens extending across and placed behind said row of inversion prisms, said row of inversion prisms being preceded by a multiple front lens extending across said row to serve as the stereoscopic base of observation, and the focal length of which is equal to the distance from the subject photographed, the front and the rear lens being symmetrical with relation to the same focal length, the back lens being limited to an horizontal rectangular band, the multiple front lens being formed by a group of several separately usable elements superposed in the same vertical plane, and of different focal lengths, each element being capable of being brought to the level of the rectilinear horizontal row of inversion prisms, to allow photographing at as many different distances as there are elements in the multiple front lens.

7. In a snapshot apparatus for peri-stereoscopic photography at progressively variable distance and having a photosensitive element, the combination of a rectilinear horizontal row of inversion prisms with an optical selector screen having vertical cylindrical lenticular elements covering the photo-sensitive element, and with a convergent lens extending across and placed behind said row of inversion prisms, said row of inversion prisms being preceded by a front lens extending across said row to serve as the stereoscopic base of observation, said front lens being constituted by the combination of a convex element and of a concave element of the same focal length, the distance apart between these two elements being adjustable, by any suitable means, the apparatus being, under these conditions, focused to infinity when two elements which constitute the front lens are in contact.

8. In a snapshot apparatus for peri-stereoscopic photography having a photosensitive element, the combination of a rectilinear horizontal row of inversion afocal optical elements with an optical selector screen having vertical cylindrical lenticular elements covering the photosensitive element, and with a convergent lens extending across and placed behind said row of afocal optical elements, the aperture angle of said lens being selected equal to that of the cylindrical lenticular elements of the selector screen on which the image is formed.

9. In a snapshot apparatus for peri-stereoscopic photography having a photosensitive element, the combination of a rectilinear horizontal row of inversion Wollaston prisms with an optical selector screen having vertical cylindrical lenticular elements covering the photo-sensitive element, and with a convergent lens extending across and placed behind the row of Wollaston prisms, the aperture angle of said lens being selected equal to that of the cylindrical lenticular elements of the selector screen on which the image is formed.

10. In a snapshot apparatus for peri-stereoscopic photography having a photosensitive element, the combination of a rectilinear horizontal row of inversion roof-type Wollaston prisms with an optical selector screen having vertical cylindrical lenticular elements covering the photosensitive element, and with a convergent lens extending across and placed behind said row of Wollaston prisms, the aperture angle of said lens being selected equal to that of the cylindrical lenticular elements of the selector screen on which the image is formed.

MAURICE BONNET.

REFERENCES CITED

The following references are of record in the file of this patent:

UNITED STATES PATENTS

| Number | Name | Date |
|---|---|---|
| 1,862,847 | Draper | June 14, 1932 |
| 1,935,471 | Kanolt | Nov. 14, 1933 |
| 2,019,234 | Nistri | Oct. 29, 1935 |
| 2,063,985 | Coffey | Dec. 15, 1936 |

FOREIGN PATENTS

| Number | Country | Date |
|---|---|---|
| 618,880 | France | Dec. 21, 1926 |
| 31,761 | France | Feb. 1, 1927 |
| | (1st Addition to No. 618,880) | |
| 750,154 | France | May 22, 1933 |